United States Patent
Trinh et al.

(10) Patent No.: US 7,742,411 B2
(45) Date of Patent: Jun. 22, 2010

(54) HIGHLY-SCALABLE HARDWARE-BASED TRAFFIC MANAGEMENT WITHIN A NETWORK PROCESSOR INTEGRATED CIRCUIT

(75) Inventors: Man Trinh, San Jose, CA (US); Steve Chen, Cupertino, CA (US); Martin Chang, San Jose, CA (US); Ray Chen, Cupertino, CA (US)

(73) Assignee: Bay Microsystems, Inc., San Jose, CA (US)

( * ) Notice: Subject to any disclaimer, the term of this patent is extended or adjusted under 35 U.S.C. 154(b) by 282 days.

(21) Appl. No.: 11/935,298

(22) Filed: Nov. 5, 2007

(65) Prior Publication Data

US 2008/0107020 A1  May 8, 2008

Related U.S. Application Data

(60) Provisional application No. 60/856,525, filed on Nov. 3, 2006.

(51) Int. Cl.
*H04L 12/26* (2006.01)
(52) U.S. Cl. .................. 370/230.1; 370/395.4
(58) Field of Classification Search ............ None
See application file for complete search history.

(56) References Cited

U.S. PATENT DOCUMENTS

| | | | |
|---|---|---|---|
| 7,206,858 B2 | 4/2007 | Hooper et al. | |
| 2003/0007494 A1 | 1/2003 | Shahar et al. | |
| 2003/0189930 A1 | 10/2003 | Terrell et al. | |
| 2004/0015599 A1* | 1/2004 | Trinh et al. | 709/232 |
| 2007/0086470 A1 | 4/2007 | Sekido et al. | |

OTHER PUBLICATIONS

Papaefstathiou, Orphanoudakis, Kornaros, Kachris, Mavroidis, Nikologiannis; "Queue Management in Network Processors"; Proceedings of the Design, Automation and Test in Europe Conference and Exhibition; 2005; 6 pgs.; IEEE Computer Society.

Maki, Shimonishi, Murase, Murata, Miyahara; "Hierarchically Aggregated Fair Queueing (HAFQ) for Per-flow Fair Bandwidth Allocation in High Speed Networks"; Graduate School of Information Science and Technology, Osaka University; 6 pgs.; Networking Research Labs, NEC Corporation.

Kramer, Banerjee, Singhal, Mukherjee, Dixit, Ye; "Fair Queueing with Service Envelopes (FQSE): A Cousin-Fair Hierarchical Scheduler for Subscriber Access Networks"; IEEE Journal on Selected Areas in Communications; Oct. 2004; 1 page; vol. 22, No. 8.

* cited by examiner

*Primary Examiner*—Steven H Nguyen
*Assistant Examiner*—Alex Skripnikov (57) ABSTRACT

A technique for managing traffic within a network processor integrated circuit (IC) involves establishing multiple queue groups, associating a different hardware counter with each queue group, and then using the hardware counters to support rate shaping and scheduling of all of the queues in the queue groups. For example, 512 queue groups of thirty-two queues each queue group are established for a total of 16,384 (16 k) different queues and a different hardware counter is associated with each queue group for a total of 512 hardware counters. The group-specific hardware counters are used to implement hardware-based rate shaping and scheduling of all 16 k queues in a resource efficient manner that supports high throughput, e.g., on the order of 40 Gbps.

14 Claims, 6 Drawing Sheets

HIGHLY-SCALABLE HARDWARE-BASED TRAFFIC MANAGEMENT WITHIN A NETWORK PROCESSOR INTEGRATED CIRCUIT

CROSS-REFERENCE TO RELATED APPLICATIONS

This application is entitled to the benefit of provisional U.S. Patent Application Ser. No. 60/856,525, filed Nov. 3, 2006, the disclosure of which is incorporated by reference herein in its entirety.

FIELD OF THE INVENTION

The invention relates generally to traffic management in packet and cell based network devices, and more particularly, to techniques for managing traffic within a network processor integrated circuit (IC).

BACKGROUND OF THE INVENTION

The Internet is fast becoming a medium that can provide voice, video, and data services to a large number of users, such as residential users. In order to provide Internet-based voice, video, and data services to a large number of users, the networking equipment at the edge of the network must be able to provide a high level of Quality of Services (QoS) control. QoS control, referred to generally as "traffic management," involves controlling the rate at which bandwidth is consumed by users as well as ensuring that the quality of time-critical data (e.g., voice and video data) is maintained. The process of controlling the rate at which bandwidth is consumed is generally referred to as "rate shaping" and the process of controlling the quality of time-critical data is generally referred to as "scheduling."

Traffic management within a network device such as a switch and/or router requires packets to be buffered so that the rate of outgoing traffic can be controlled to meet bandwidth limitations and so that the order of outgoing traffic can be controlled and rearranged as needed to meet the QoS demands. Buffered traffic is typically managed using queues, where each queue is a linked list of information that relates to the packets that are buffered and waiting to be forwarded from the network device.

Conventional traffic management operations involve controlling a few strict priority traffic flows destined to an output port. All of the traffic destined to the same output port is classified into a few different priorities with a separate queue associated with each priority. The number of queues needed to support conventional traffic management within a network device is equal to the number of output ports times the number of different priorities. For example, if a network device has ten output ports and supports four different priorities, then the network device only needs to maintain and manage forty different queues.

In emerging uses, where network devices support Internet-based voice, video, and data services to a large number of residential users, there is a need to maintain a large number of queues. For example, in a network of four-thousand users with each user subscribing to four different applications (2 videos, 1 voice, and 1 data), the network device needs to be able to manage sixteen-thousand different queues. For a relatively small number of queues (e.g., less than 100), traffic management can easily be implemented in software with a high speed CPU. However, as the number of queues increases, it becomes more difficult to implement traffic management in software at a high enough rate to support the expected traffic throughput. In the case of four-thousand different users, if each user subscribes to 10 megabits per second (Mbps) of service, the total throughput required of a network device is 40 gigabits per second (Gbps). Implementing software-based traffic management at 40 Gbps is a difficult task. In view of this, what is needed is a technique for traffic management that supports thousands of different queues and that can be efficiently implemented in hardware in a network processor IC at rates in the range of, for example, 40 Gbps.

SUMMARY OF THE INVENTION

A technique for managing traffic within a network processor IC involves establishing multiple queue groups, associating a different hardware counter with each queue group, and then using the hardware counters to support rate shaping and scheduling of all of the queues in the queue groups. For example, 512 queue groups of thirty-two queues each queue group are established for a total of 16,384 (16 k) different queues and a different hardware counter is associated with each queue group for a total of 512 hardware counters. The group-specific hardware counters are used to implement hardware-based rate shaping and scheduling of all 16 k queues in a resource efficient manner that supports high throughput, e.g., on the order of 40 Gbps. Because multiple queues share the same hardware counter, a large number of queues can be rate shaped and scheduled using hardware-based techniques without using a separate hardware counter for each queue. Hardware counters take up a relatively large area on an IC device and therefore providing a separate hardware counter for each queue would require a large IC footprint or reduce the amount of area available on the IC for other circuitry. Even though multiple queues share the same hardware counter, queue-specific credit information is established so that each queue can be rate shaped to a queue-specific rate. Additionally, dividing the queues into queue groups enables scheduling to be accomplished in a hierarchical manner, thereby avoiding the need to arbitrate among the total set of queues (e.g., 16 k queues) in parallel.

In an embodiment, a method for managing traffic within a network processor IC involves establishing multiple queue groups, wherein each queue group includes multiple queues for queuing incoming traffic, associating a different hardware counter with each queue group, each group-specific hardware counter comprising a multi-bit register that is changed in response to a clock signal, rate shaping traffic within the queues of the queue groups in response to the group-specific hardware counters associated with the queue groups, and scheduling traffic within queues of the queue groups in response to the group-specific hardware counters associated with the queue groups. In a further embodiment, an initial value is established for each group-specific hardware counter, wherein the initial value establishes a group-specific time interval for each queue group. In a further embodiment, rate shaping involves establishing an initial credit value for each queue and tracking a current credit value for each queue, wherein the initial credit value indicates available credit per group-specific time interval and the current credit value represents available credit at a particular point within a group-specific time interval.

In another embodiment, a network processor IC for managing traffic includes a plurality of queues organized into queue groups, a rate shaper module comprising a different hardware counter associated with each queue group, each group-specific hardware counter comprising a multi-bit register that is changed in response to a clock signal, the rate shaper module configured to rate shape traffic of the queues within the queue groups in response to the group-specific hardware counters associated with the queue groups, and a scheduler module configured to schedule traffic within the queues of the queue groups in response to the group-specific hardware counters associated with the queue groups.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 illustrates a timeline of a conventional queue processing scheme in which, during one round of queue processing, packets are continuously scheduled from the same queue until the queue runs out of credits or packets and then the next queue is processed until it runs out of credits or packets, and so on.

Throughout the description, similar reference numbers may be used to identify similar elements.

DETAILED DESCRIPTION

Figure 1:
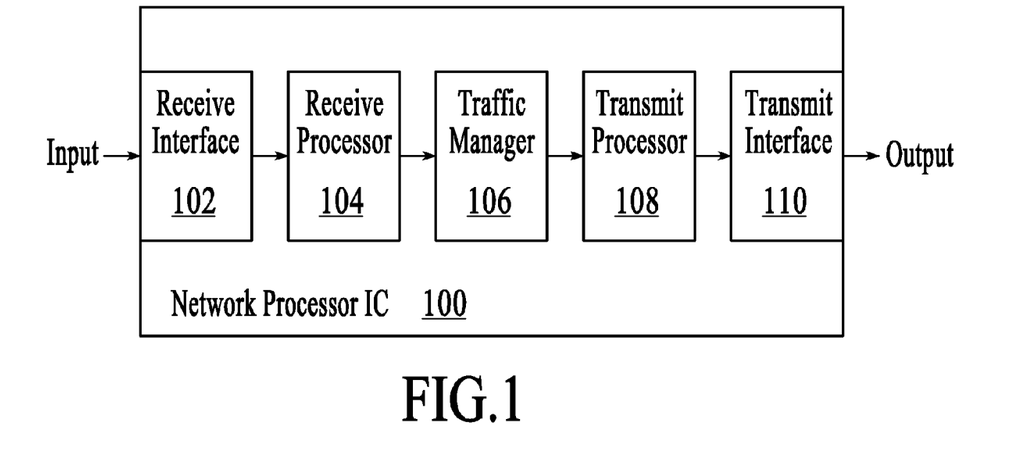
FIG. 1 depicts a functional block diagram of an embodiment of a network processor IC that can be used in a network device such as a router and/or a switch.

FIG. 1 depicts a functional block diagram of an embodiment of a network processor IC 100 that can be used in a network device such as a router and/or a switch to process various different types of network traffic (e.g., voice, video, and data). The network processor IC includes a receive interface 102, a receive processor 104, a traffic manager 106, a transmit processor 108, and a transmit interface 110. The receive interface performs, for example, physical layer conversion and deserializing operations. The receive processor supports, for example, traffic classification, traffic editing, and queuing operations. The traffic manager supports, for example, queue management, rate shaping, and scheduling operations. Operations of the traffic manger are the focus of the invention and are described in more detail below. The transmit processor supports, for example, traffic editing and dequeing operations and the transmit interface supports, for example, serializing and physical layer conversion operations.

The traffic manager 106 supports queue management, rate shaping, and scheduling operations within the network processor IC. For example, the traffic manager enables bandwidth to be distributed and managed on a per-group basis and a per-queue basis. This enables bandwidth to be distributed to multiple different users and enables traffic to be managed on a per-user basis and on a per-traffic type basis. For example, a user can be allocated a certain fixed amount of bandwidth and the total amount of bandwidth available to the user can be divided into different traffic types (e.g., voice, video, and data), with each different traffic type being managed independently.

Figure 2:
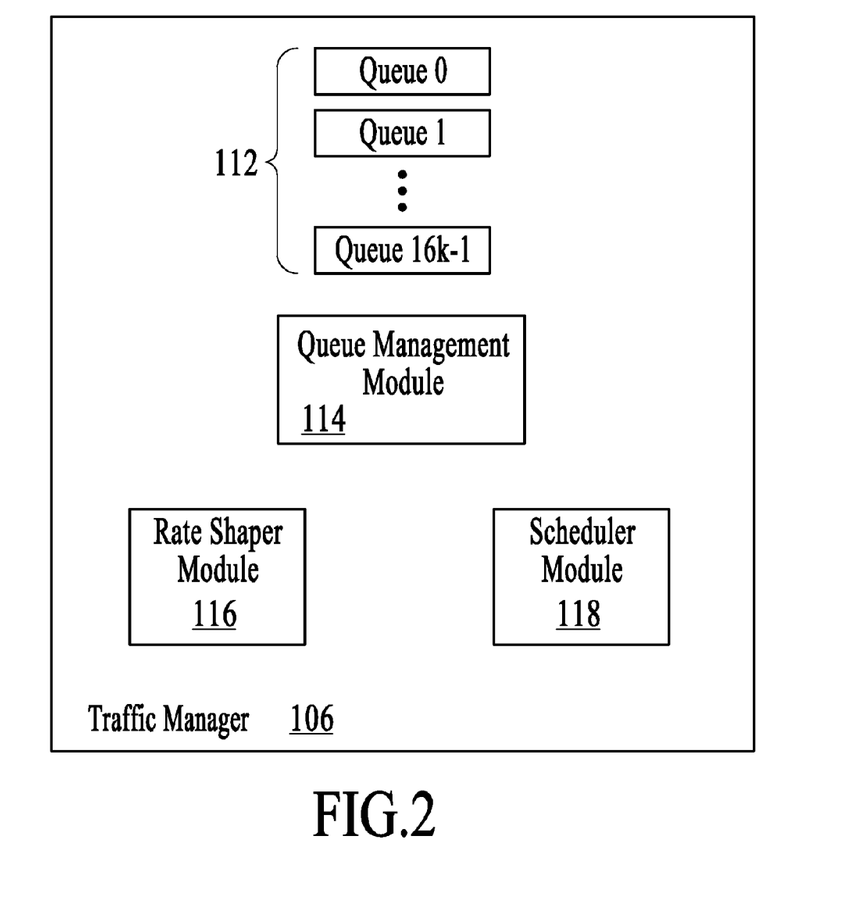
FIG. 2 depicts a functional block diagram of a traffic manger that includes multiple queues, a queue management module, a rate shaper module, and a scheduler module.

FIG. 2 depicts a functional block diagram of a traffic manager 106 that includes multiple queues 112, a queue management module 114, a rate shaper module 116, and a scheduler module 118. The queues are used to queue packet and cell traffic that is processed by the network processor IC 100. Throughout the description, the term "packet" is used to refer to any datagram including, for example, variable-length Internet Protocol (IP) packets, variable-length Ethernet frames, and fixed-length Asynchronous Transfer Mode (ATM) cells. Although certain types of datagrams are identified, the network processor IC can also process other types of datagrams. The queues are typically linked lists of information related to the packets while the packets themselves are buffered in memory that is external to the network processor IC. Although in this embodiment, packets are buffered in external memory, in an alternative embodiment, entire packets could be buffered within the network processor IC. Information related to the queues is described in more detail below. The queue management module manages the organization of the queues into queue groups and sub-groups. The organization of queues into queue groups and sub-groups is described in more detail below.

The rate shaper module 116 manages rate shaping functions related to queued traffic. Rate shaping involves controlling the transmission of data to a pre-defined volume over a known time interval. For example, rate shaping involves limiting a traffic stream to 10 Mbps. Many techniques, including credit based techniques, are used to implement rate shaping of packet-based traffic. Because rate shaping involves controlling the number of bits over a time interval, a rate shaping implementation includes a timing aspect and a bit tracking aspect. As is described in more detail below, the rate shaper module utilizes hardware counters associated with queue groups to track the time intervals for rate shaping of each queue within a queue group. The rate shaper module is responsible for setting the initial counter values of the hardware counters, for reloading the initial counter values, and for maintaining the status of each hardware counter. The rate shaper module is also responsible for credit management operations associated with the queue groups, sub-groups, and queues including the setting of initial credit values and the tracking of current credit.

The scheduler module 118 is responsible for scheduling traffic, based on a priority scheme, among multiple queue groups, multiple sub-queues, and multiple queues. The scheduler module supports scheduling algorithms such as round-robin, weighted round-robin, deficit round-robin, modified deficit round-robin, weighted fair queuing, class-based weighted fair queuing and strict priority. The above-identified scheduling algorithms are typically associated with variable-length packet traffic (e.g., IP packet and/or Ethernet frame traffic). The scheduler module also supports traffic schemes associated with fixed-length cell traffic (e.g., ATM cell traffic) such as constant bit rate (CBR), variable bit rate (VBR), unspecified bit rate (UBR), UBR with weighted round-robin among UBR streams (UBR+), and UBR with minimum cell rate (MCR) guarantee (UBR+M).

As described above, it is difficult to rate shape and schedule traffic from a large number of queues (e.g., thousands of queues) at throughput rates on the order of 40 Gbps using software-based techniques. In accordance with an embodiment of the invention, multiple queue groups are established within a network processor IC and a different hardware counter is associated with each queue group. For example, 512 queue groups of thirty-two queues each queue group are established for a total of 16,384 (16 k) different queues and a different hardware counter is associated with each queue group for a total of 512 hardware counters. The group-specific hardware counters are used to implement hardware-based rate shaping and scheduling of all 16 k queues in a resource efficient manner that supports high throughput (e.g., on the order of 40 Gbps).

Figure 3:
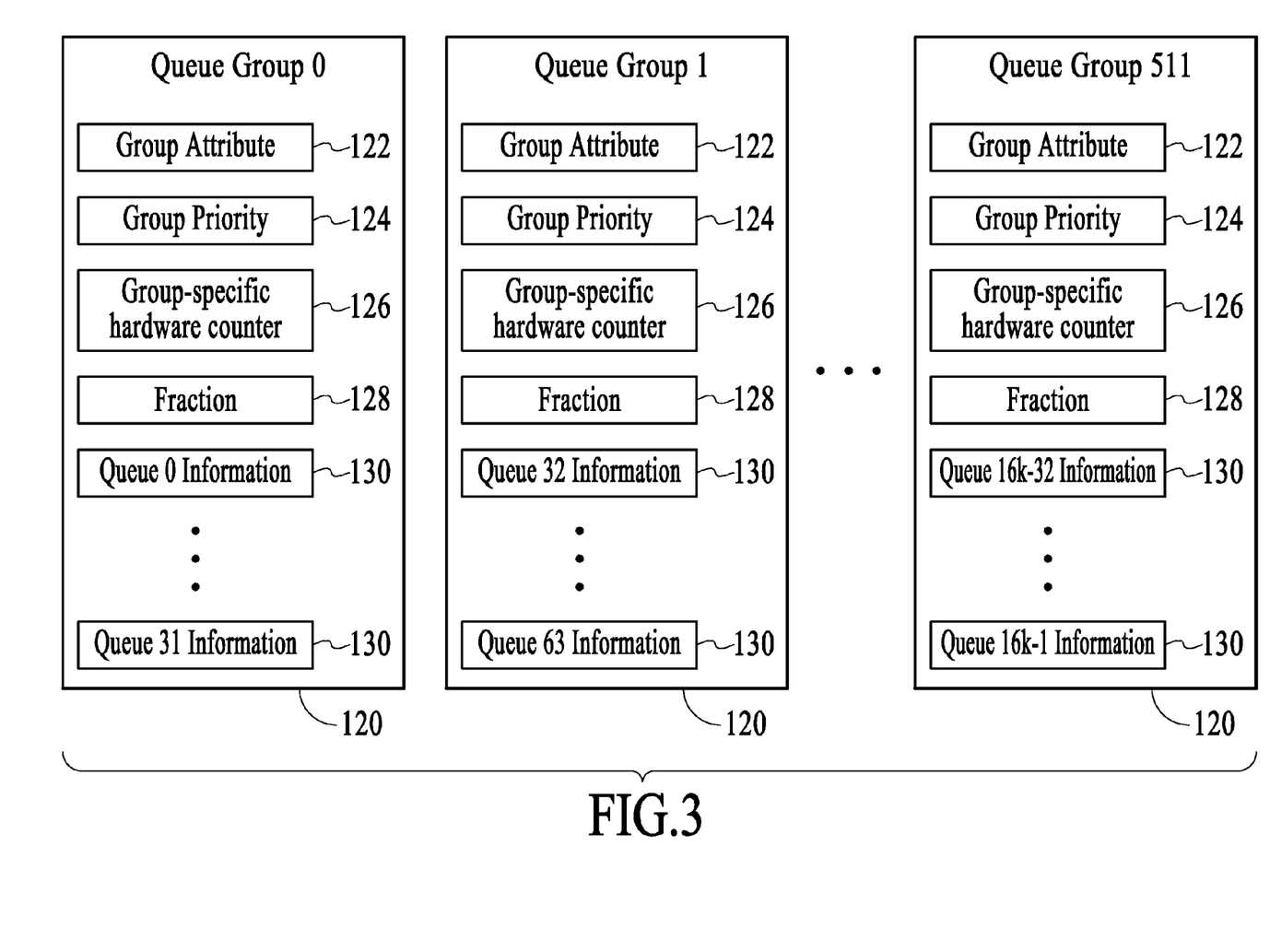
FIG. 3 illustrates information associated with each queue group in a set of 512 queue groups.

FIG. 3 illustrates information associated with each queue group 120 in a set of 512 queue groups. In accordance with an embodiment of the invention, each queue group includes a group attribute field 122, a group priority field 124, a group-specific hardware counter 126, a fraction field 128, and a queue information field 130 for each of the thirty-two queues in the queue group. In the embodiment of FIG. 3, the group attribute field includes information applicable to queues in the queue group such as an indication of whether one queue or all queues in the queue group are to be processed when the queue group is selected, an indication of whether the queues within the queue group are to be processed based on their assigned credits or based on some other criteria such as one scheduling command per selected queue, an indication that the queue group has at least one VBR queue, an indication that the queue group has at least one queue that can have a dummy packet generated when there is no traffic in the queue, and an indication as to which trunk the queue group belongs to.

In the embodiment of FIG. 3, the group priority field 124 is a multi-bit field that includes a priority (also referred to as a "weight") of the queue group. In an embodiment, the group priority field is a 10-bit field although a different size field is possible. As is described below, the group priority is used in group-level arbitration to select a queue group.

In the embodiment of FIG. 3, the group-specific hardware counter 126 is a multi-bit register that is changed in response to a clock signal. For example, the group-specific hardware counter is a down counter that is set to an initial value and decremented by one unit at each clock cycle of a system clock. In the embodiment of FIG. 3, the fraction field 128 is a multi-bit field (e.g., a 9-bit field) that is used to adjust the effective rate of the system clock. For example, the field can be populated with a clock divider value that is used to divide down the clock signal from the system clock. The clock divider value within the fraction field allows for a degree of control over the length of each clock period that is used to decrement the group-specific hardware counters. The duration of the time interval tracked by a particular group-specific hardware counter is a function of the initial counter value, the period of the system clock, and the fraction field. When a group-specific hardware counter decrements to zero, the counter's time interval is expired and an elapsed time interval status is triggered. The elapsed time interval status signal is used to trigger rate shaping and scheduling as described below. Additionally, once the group-specific hardware counter reaches zero, the counter is reset to its initial value and restarted. In an embodiment, the group-specific hardware counters are 23-bit down counters. A 23-bit down counter is used because it can support a minimum ATM cell rate of 32 Kbps using a system clock of 367 MHz. A 23-bit down counter supports a 32 Kbps ATM cell rate as follows:

32 Kbps=32,000 bits/sec*(1 cell/424 bits)=75 cells/s;

75 cells/sec=1 sec/75 cells*(1 clk/(1/367 MHz))=4,893,333 clk/cell; and 4,893,333 clk/cell=requires at minimum a 23-bit counter.

Figure 4:
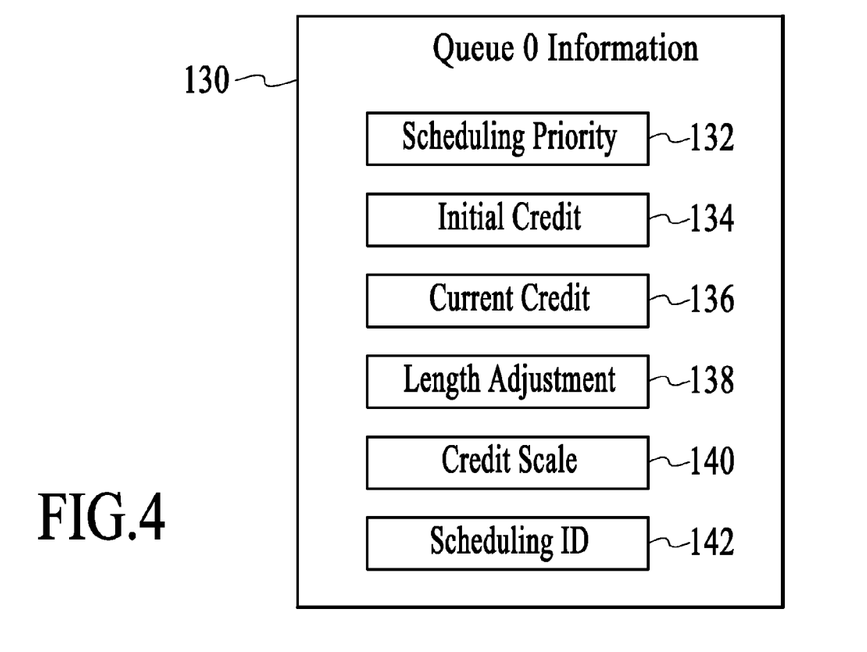
FIG. 4 illustrates queue information that may be stored in a network processor IC for each queue.

The queue information fields 130 store information associated with each queue in a queue group. The queue information may include, for example, queue scheduling priority information, credit information including initial, current, and maximum credit, length adjustment information, credit scale information, and scheduling identification information. FIG. 4 illustrates a queue information field 130 that may be stored in the network processor IC for each queue, e.g., queue 0. As depicted in the example of FIG. 4, fields within the queue information field for queue 0 include a scheduling priority field 132, an initial credit field 134, a current credit field 136, a length adjustment field 138, a credit scale field 140, and a scheduling identification (ID) field 142. The scheduling priority field is used to store a scheduling priority that indicates the priority of the queue. For example, the scheduling priority field is a 5-bit field in which a value of "0" indicates the highest priority and a value of "31" indicates the lowest priority. The initial credit field is used to store an initial credit value that defines the amount of data that is available to be transmitted during the group-specific time interval. In an embodiment, the initial credit field is a 28-bit field. The credit scale field sets the scale of the credits. For example, each credit can be set to represent one byte (8 bits), multiple bytes, or some other amount of digital data. The credit field can be adjusted to change the rate of a queue. The credit scale field enables the effective rate associated with a queue to be adjusted over a wide range. Once the initial credit value and the credit scale are set, the rate of the corresponding queue is calculated as:

rate (bps)=(initial credit value*credit scale (bits/credit))/(initial counter value*clock period (clk/s)).

The current credit field is used to store a current credit value that represents available credit at a particular point within a group-specific time interval. That is, the current credit value tracks the amount of data left to be transmitted during a current group-specific time interval. In an embodiment, the current credit field is a 28-bit field that is updated dynamically after each round of scheduling. The length adjustment field indicates that the length of a packet should be adjusted by some number of bits, either up or down. A packet length adjustment may be needed to compensate for any additional editing of the packets after scheduling or to compensate for the Inter-Frame Gap (IFG) in an Ethernet frame. The scheduling ID field is used to store a value that maps to a queue identifier (ID). In an embodiment, queue IDs are identifiers that represent physical queues and the scheduling IDs are logical IDs that are used in the rate shaping and scheduling operations. The traffic manager maintains a queue ID table that maps scheduling IDs to queue IDs and a scheduling ID table that maps queue IDs to scheduling IDs. The scheduling IDs are used in the rate shaping and scheduling operations and then the scheduling IDs are mapped back to the queue IDs for dequeuing operations. The use of scheduling IDs instead of queue IDs in the rate shaping and scheduling operations enables flexibility in the management of queue groups and sub-groups. Because the queue information is relatively small, the queue information can be maintained in an internal memory of the network processor IC.

The queues 112 within a queue group 120 can be further divided into sub-groups. In an embodiment, a queue group can be divided into sub-groups that are a power of two. For example, a queue group of thirty-two queues can be divided into:

2 sub-groups of 16 queues per sub-group;

4 sub-groups of 8 queues per sub-group; or 8 sub-groups of 4 queues per sub-group.

Allowing queue groups of thirty-two queues to be divided into sub-groups that are a power of two enables the thirty-two queues and the sub-group associations to be efficiently identified with a 5-bit vector. In an embodiment, the most significant bits of the 5-bit vector are used for sub-group identification and the least significant bits are used to identify the queues within a sub-group. How the bits are divided is based on the sub-group configuration. For example, when a queue-group has no sub-groups, all five bits are used to uniquely identify each of the thirty-two queues, when a queue-group has two sub-groups of sixteen queues, the most significant bit is used to identify the two sub-groups and the four least significant bits are used to identify the sixteen queues within the two sub-groups, and when a queue-group has four sub-groups of eight queues, the two most significant bits are used to identify the four sub-groups and the three least significant bits are used to identify the eight queues within the four sub-groups.

When a queue group is divided into sub-groups, information similar to the queue information described with reference to FIG. 4 can be stored for each sub-group. In particular, a sub-group can have its own sub-group priority, initial credit and current credit, so that traffic can be shaped and scheduled on a per-sub-group basis as well as a per-group and a per-queue basis. Being able to divide queue groups into sub-groups enables traffic to be managed in finer granularity. For example, if a queue group is divided into eight sub-groups with four queues in each sub-group, each user can be associated with a different sub-group and the four queues within each sub-group can be used to manage four different traffic streams that are associated with the user (e.g., two video streams, one voice stream, and one data stream).

Figure 5:
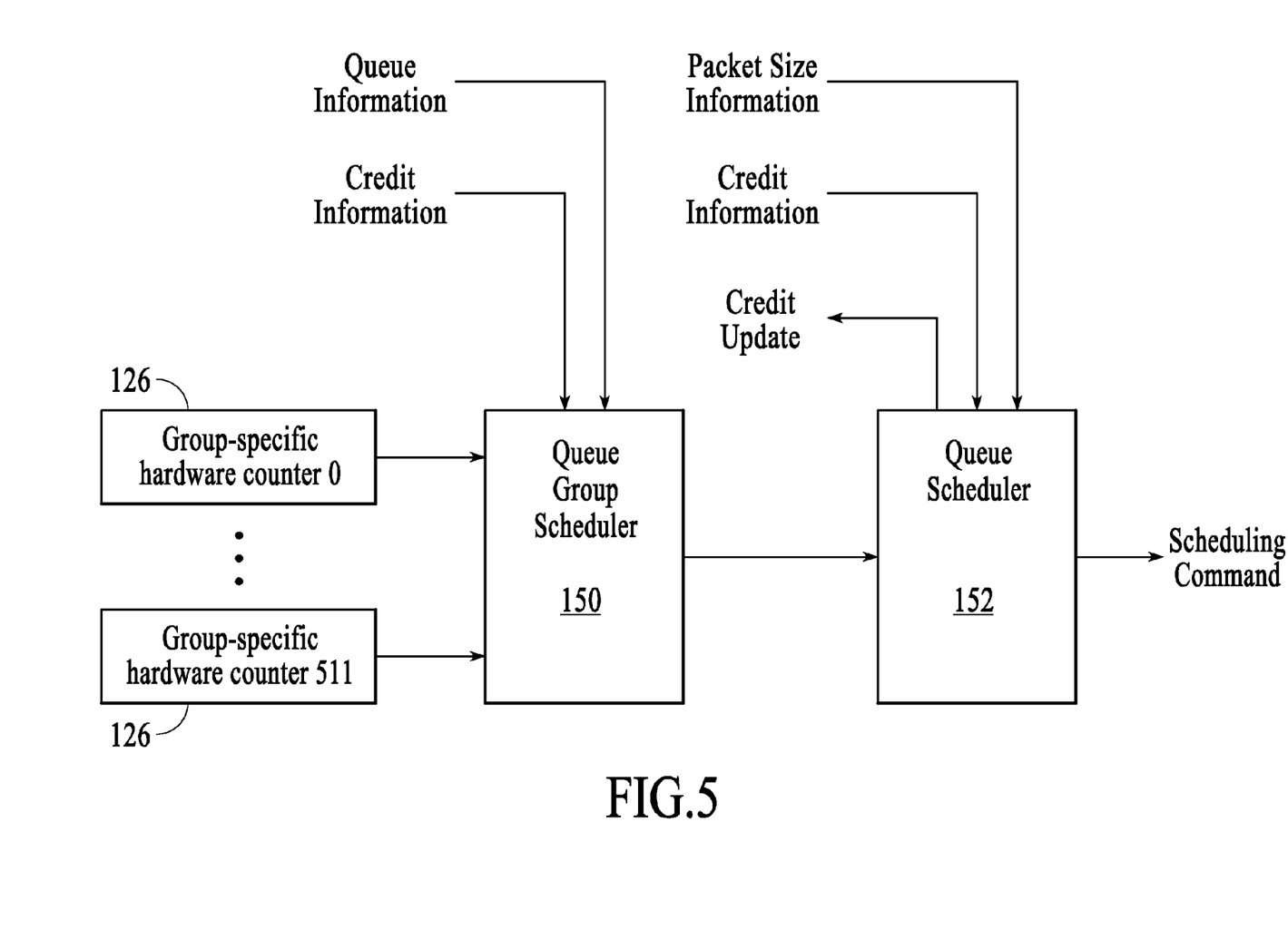
FIG. 5 is a functional block diagram that illustrates shaping and scheduling operations performed by the traffic manager of the network processor IC.
Figure 6:
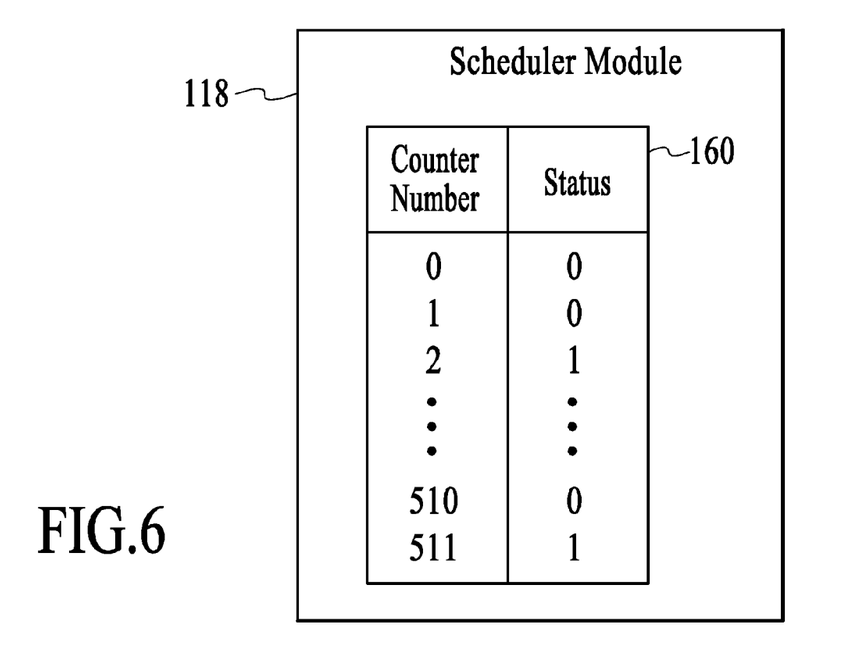
FIG. 6 depicts a counter status bit map that is maintained by the scheduler module of FIG. 2.

FIG. 5 is a functional block diagram that illustrates shaping and scheduling operations performed by the traffic manager 106 of the network processor IC 100. In particular, FIG. 5 depicts group-specific hardware counters 0-511, 126, a queue group scheduler 150, and a queue scheduler 152. The group-specific hardware counters count down from their initial values and provide an elapsed time interval status signal to the queue group scheduler once the respective counter reaches zero. The elapsed time interval status signal indicates that the time interval tracked by the group-specific hardware counter has expired. In an embodiment, the scheduler module maintains a counter status bit map that tracks the status of each group-specific hardware counter. FIG. 6 depicts a counter status bit map 160 that is maintained by the scheduler module 118. The counter status bit map indicates the status of each group-specific hardware counter, for example, with a status signal of "1" indicating that the group-specific time interval has expired and a status signal of "0" indicating that the group-specific time interval has not expired. In an embodiment, all of the traffic in a queue-group can be scheduled without rate shaping. In this case, the corresponding group-specific hardware counter can be set to an initial counter value of zero.

Once the group-specific time interval of the queue group has expired, the queue group scheduler 150 determines whether the queue group has queued data and whether the queues have available credits. Information indicating whether the queue group has queued data (queue information) and whether the queues have available credits (credit information) is supplied to the queue group scheduler from a source within the traffic manager. If the queue-specific time interval for a queue group has expired and if the queue group has some queued packets and available credits, then the queue group is included in a group-level arbitration performed by the queue group scheduler. In the group-level arbitration, the queue group scheduler performs arbitration rounds in which a queue group is selected during each arbitration round. In an embodiment, the queue groups are selected on a priority basis with the highest priority queue group being selected. Other algorithms can be implemented at the group-level arbitration to select a queue group. Additionally, the priority of a queue group can be dynamically adjusted to ensure that the queue group eventually gets selected by the queue group scheduler.

Once a queue group 120 is selected by the queue group scheduler 150, the selected queue group is communicated to the queue scheduler 152. If the selected queue group is not divided into sub-groups, then the queue scheduler arbitrates among the thirty-two queues on a priority basis to select a queue (e.g., which is identified by a scheduling ID). Although a priority based arbitration technique is described, other arbitration techniques can be used. If the queue group is divided into sub-groups, then the queue scheduler first arbitrates among the sub-groups, for example, based on a pre-established sub-group priority to select a sub-group and then arbitrates among the queues in the selected sub-group to select a queue. Once a queue is selected, the queue scheduler compares packet size information to current credit information related to the queue to determine if the queue has enough credit to allow the packet to be forwarded. Information related to packet size and credit values can be supplied to the queue scheduler from a source within traffic manager. If the queue has enough credit to allow the packet to be forwarded, then a scheduling command is issued by the queue scheduler to trigger the corresponding packet to be forwarded and the current credit is updated to reflect the volume of data that was just scheduled. If the selected queue does not have enough credit available, then the packet is not scheduled and has to wait for the next scheduling round in which the available credits will have been refreshed to the initial credit value. Because a queue group is included within the group-level arbitration process only after the group-specific hardware counter has expired, the rate shaping and scheduling as described with reference to FIG. 5 is implemented in response to the group-specific hardware counter of the queue group.

As described above, the scheduling operations performed by the queue group scheduler 150 and the queue scheduler 152 are broken down into increments of queue groups. Because the scheduling operations are broken down into increments of queue groups, the information that needs to be provided to the schedulers (e.g., queue information, credit information, packet size information, etc.) is also broken down into per-group increments. In particular, the queue group scheduler only needs information for a queue group whose timer has expired and it is highly unlikely that all 512 of the timers will expire simultaneously. This avoids the need to simultaneously provide queue, credit, and/or packet size information to the schedulers for large numbers of queues. For example, if 16 k queues were to be scheduled simultaneously, an enormous amount of information would need to be made available to the schedulers. In contrast, because the scheduling is broken down into increments of queue groups, information for only one or a few queue groups is needed to implement rate shaping and scheduling for queues in the instant queue groups.

Figure 7:
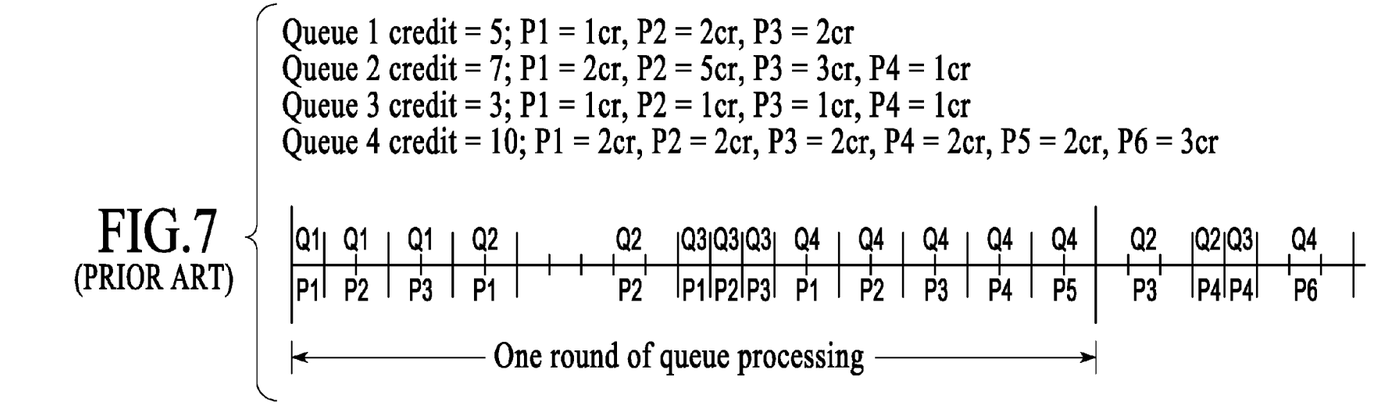

Queues 112 within a queue group 120 or sub-group can be processed in different ways. FIG. 7 illustrates a timeline of a conventional queue processing scheme that includes rate shaping and scheduling of all queues according to, for example, a weighted round-robin or deficit round-robin scheduling algorithm. In the example of FIG. 7, during one round of queue processing, packets are continuously scheduled from the same queue until the queue runs out of credits or packets and then the next queue is processed until it runs out of credits or packets, and so on. This scheme of queue processing is referred to as a "process until the end" queue processing scheme because packets from a single queue are sent until the queue runs out of credits and the process moves on to the next queue. As depicted in FIG. 7, the initial credits and packets associated with each of four queues (queue 1, queue 2, queue 3, and queue 4) are as follows:

queue 1 credit=5; queued packets, P1=1 cr, P2=2 cr, P3=2 cr;

queue 2 credit=7; queued packets, P1=2 cr, P2=5 cr, P3=3 cr, P4=1 cr;

queue 3 credit=3; queued packets, P1=1 cr, P2=1 cr, P3=1 cr, P4=1 cr; and queue 4 credit=4; queued packets, P1=2 cr, P2=2 cr, P3=2 cr, P4=2 cr, P5=2 cr, P6=3 cr.

Referring to FIG. 7, according to the "process until the end" queue processing scheme, with regard to queue 1, packets P1, P2, and P3 are scheduled until all five of queue 1's credits are consumed. No packets are left unscheduled in the current round of queue processing. With regard to queue 2, packets P1 and P2 are scheduled until all seven of queue 2's credits are consumed. Packets P3 and P4 are left unscheduled in the current round of queue processing because the queue has consumed all of its credits for the round. With regard to queue 3, packets P1, P2, and P3 are scheduled until all three of queue 3's credits are consumed. Packet P4 is left unscheduled in the current round of processing because the queue has consumed all of its credits for the round. With regard to queue 4, packets P1, P2, P3, P4, and P5 are scheduled until all ten of queue 4's credits are consumed. Packet P6 is left unscheduled in the current round of queue processing. In the next round of queue processing each queue's credits are refreshed to their initial values and packets P3 and P4 of queue 2 are scheduled, packet P4 of queue 3 is scheduled, and then packet P6 of queue 4 is scheduled.

Figure 8:
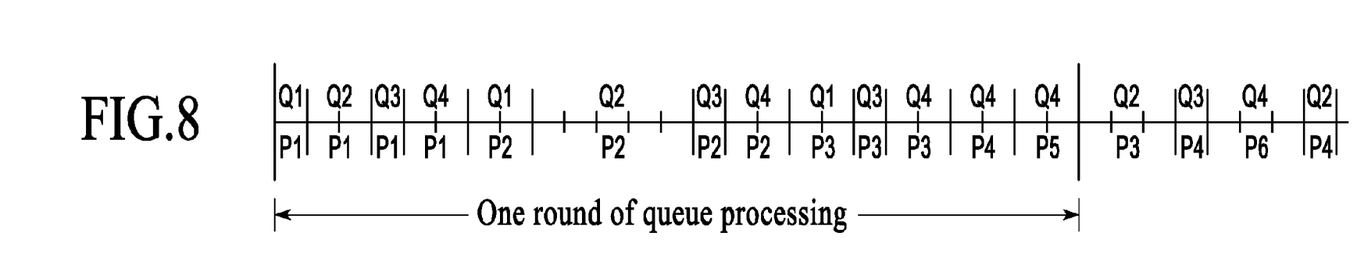
FIG. 8 illustrates a timeline of a queue processing scheme in accordance with an embodiment of the invention in which, during one round of queue processing, queues are limited to one scheduling command per queue and revisited in a round-robin fashion until the queues are out of credits and/or packets.

In an alternative embodiment in accordance with the invention, instead of processing a queue until all of the credits are consumed or until there are no more queued packets, the scheduling of packets from each queue within one round of queue processing is limited to one scheduling command per queue and each queue is revisited in a round-robin fashion until the queue is out of credits and/or packets. FIG. 8 illustrates a timeline of a queue processing scheme in which, during one round of queue processing, queues are limited to one scheduling command (e.g., the scheduling of one packet) per queue and revisited in a round-robin fashion until the queues are out of credits and/or packets. In the example of FIG. 8, the initial credits and packets associated with each of the four queues are exactly as they are in FIG. 7. According to the "interleaving" scheme, with regard to queue 1, only packet P1 is scheduled from queue 1 in an initial pass even though queue 1 still has available credits and queued packets. After scheduling from queue 1, the process moves next to queue 2, where only packet P1 is scheduled even though queue 2 still has available credits and queued packets. After scheduling from queue 2, the process moves next to queue 3, where only packet P1 is scheduled even though queue 3 still has available credits and queued packets. After scheduling from queue 3, the process moves next to queue 4, where only packet P1 is scheduled even though queue 4 still has available credits and queued packets. After scheduling from queue 4, the process returns to queue 1, where only packet P2 is scheduled even though queue 1 still has available credits and a queued packet. As illustrated in FIG. 8, the process continues cycling through the queues, one scheduling command (e.g., one packet) per queue, in round-robin fashion until the queue is out of credits or out of packets. Once queues 1, 2, and 3 are out of credits and/or packets, packets are scheduled continuously from queue 4 until queue 4's credits for the round are consumed. In the next round of queue processing, the one scheduling command per queue scheme is repeated. As illustrated in FIG. 8, the scheduling of queues one scheduling command per queue in a round-robin manner results in packets from the different queues being interleaved between each other within one round of queue processing. Although the interleaving technique described with reference to FIG. 8 limits each queue to one scheduling command per queue, alternative interleaving techniques can artificially limit the queues to a different threshold that is less than the total amount of credit available to the queue in one round of queue processing.

The "process until the end" scheme described with reference to FIG. 7 can be advantageous in that the queue scheduler does not need to switch context from one queue to another queue within a scheduling round and because the queue scheduler does not need to remember which queues still have credits within a scheduling round since each queue is processed until its credits are consumed. However, a drawback to the "process until the end" scheme is that the traffic can be bursty because packets from one queue are sent in a burst up to the maximum credits allowed in the round before the next queue is processed. In contrast to the "process until the end" scheme, the "interleaving" scheme described with reference to FIG. 8 smooths out the traffic scheduling among the queues within a scheduling round by preventing large blocks of packets from being scheduled from a single queue while other queues are forced to wait to be processed. The interleaving queue processing scheme is enabled in part by the grouping of queues into queue groups. For example, queue status information needed to implement the interleaving queue processing scheme can be efficiently managed in per-group increments as opposed to providing simultaneous access to the queue status information for all 16 k queues.

Because multiple queues share the same hardware counter, a large number of queues can be rate shaped and scheduled using hardware-based techniques without using a separate hardware counter for each queue. Hardware counters take up a relatively large area on an IC device and therefore providing a separate hardware counter for each queue would require a large IC footprint or reduce the amount of area available on the IC for other circuitry. Sharing the hardware counters among a group of queues enables a network processor IC to be highly-scalable with regard to the number of available queues. Even though multiple queues share the same hardware counter, the queue-specific credit information enables each queue to be rate shaped to a queue-specific rate. Additionally, dividing the queues into queue groups enables scheduling to be accomplished in a hierarchical manner, thereby eliminating the task of arbitrating among the total set of queues (e.g., 16 k queues) in parallel.

Although the queue groups are described as having thirty-two queues per queue group, the number of queues per queue-group is implementation specific. Likewise, the total number of queues can be more or less than 16 k. Additionally, although 512 queue groups are described, the number of queue groups is implementation specific.

Figure 9:
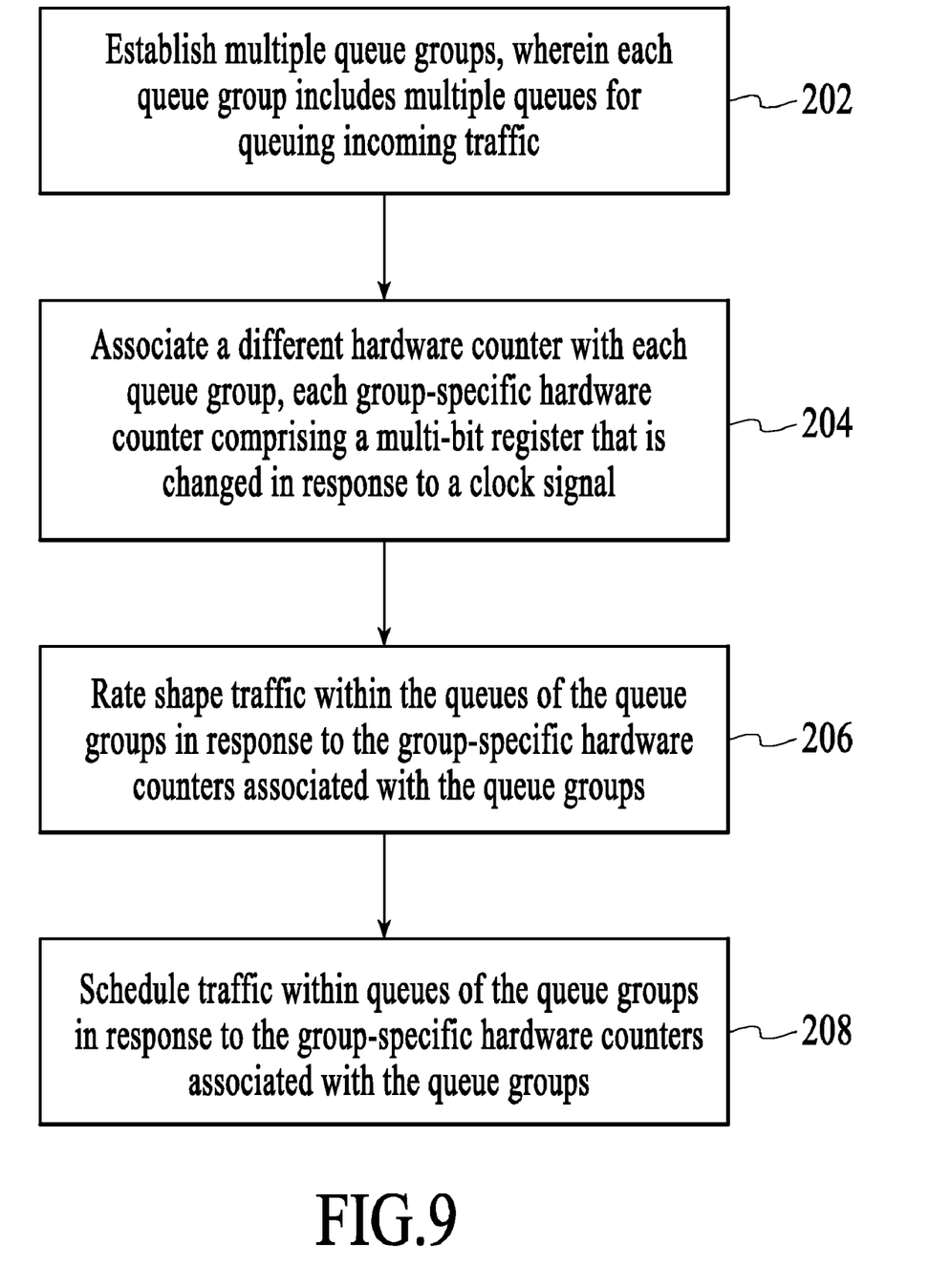
FIG. 9 is a process flow diagram of a method for managing traffic within a network processor IC in accordance with an embodiment of the invention.

FIG. 9 is a process flow diagram of a method for managing traffic within a network processor IC in accordance with an embodiment of the invention. At block 202, multiple queue groups are established, wherein each queue group includes multiple queues for queuing incoming traffic. At block 204, a different hardware counter is associated with each queue group, each group-specific hardware counter comprising a multi-bit register that is changed in response to a clock signal. At block 206, traffic is rate shaped within the queues of the queue groups in response to the group-specific hardware counters associated with the queue groups. At block 208, traffic is scheduled within queues of the queue groups in response to the group-specific hardware counters associated with the queue groups. In an embodiment, an initial value is established for each group-specific hardware counter, wherein the initial value establishes a group-specific time interval for each queue group. The length of a group-specific time interval is a function of the initial value and a clock period of the clock signal. In a further embodiment, rate shaping is accomplished by establishing an initial credit value for each queue and tracking a current credit value for each queue, wherein the initial credit value indicates available credit per group-specific time interval and the current credit value represents available credit at a particular point within a group-specific time interval.

Although specific embodiments of the invention have been described and illustrated, the invention is not to be limited to the specific forms or arrangements of parts as described and illustrated herein. The invention is limited only by the claims.

What is claimed is:

1. A method for managing traffic within a network processor integrated circuit (IC), the method comprising:
    within a network processor IC, establishing multiple queue groups, wherein each queue group includes multiple queues for queuing incoming traffic;
    within the network processor IC, associating a different hardware counter with each queue group, each group-specific hardware counter comprising a multi-bit register that is changed in response to a clock signal;
    within the network processor IC, establishing an initial value for each group-specific hardware counter, wherein the initial value establishes a group-specific time interval for each queue group and wherein the length of a group-specific time interval is a function of the initial value and a clock period of a clock signal;
    within the network processor IC, rate shaping traffic within the queues of the queue groups in response to the group-specific hardware counters associated with the queue groups, wherein the rate shaping comprises establishing an initial credit value for each queue and tracking a current credit value for each queue, wherein the initial credit value indicates available credit per group-specific time interval and the current credit value represents available credit at a particular point within the group-specific time interval; and
    within the network processor IC, scheduling traffic within queues of the queue groups in response to the group-specific hardware counters associated with the queue groups.

2. The method of claim 1 wherein the rates of queues within a queue group are set as a function of the initial counter value of the respective group-specific hardware counter and the initial credit value of each respective queue.

3. The method of claim 2 wherein scheduling comprises including a queue group in a group-level scheduling arbitration process once the group-specific hardware counter indicates that the group-specific time interval of the respective queue group has expired.

4. The method of claim 3 further comprising:
    associating priorities with the queue groups and wherein scheduling comprises selecting groups from the multiple queue groups in response to the queue group priorities; and
    associating priorities with the queues within a queue group and wherein scheduling comprises selecting queues from the queues in a queue group in response to the queue priorities.

5. The method of claim 3 wherein scheduling comprises interleaving bandwidth allocations amongst queues in a queue group, wherein interleaving bandwidth allocations amongst queues in a queue group comprises, within one round of queue processing, establishing a limit and scheduling packets up to the limit regardless of whether the corresponding queue has credit available and revisiting queues in a round-robin fashion until the queues are out of credits or have no queued packets.

6. The method of claim 1 further comprising establishing sub-groups of queues within a queue group, wherein traffic within the sub-groups is rate shaped and scheduled in response to the corresponding group-specific hardware counter.

7. The method of claim 6 wherein the number of sub-groups within a queue group is a power of two.

8. A network processor integrated circuit (IC) for managing traffic, the network processor IC comprising:
    a plurality of queues organized into queue groups;
    a rate shaper module comprising a different hardware counter associated with each queue group, each group-specific hardware counter comprising a multi-bit register that is changed in response to a clock signal, the rate shaper module configured to rate shape traffic of the queues within the queue groups in response to the group-specific hardware counters associated with the queue groups; and
    a scheduler module configured to schedule traffic within the queues of the queue groups in response to the group-specific hardware counters associated with the queue groups;
    wherein an initial value is established for each group-specific hardware counter, wherein the initial value establishes a group-specific time interval for each queue group;
    wherein the length of a group-specific time interval is a function of the initial value and a clock period of a clock signal; and
    wherein the rate shaper module is further configured to establish an initial credit value for each queue and track a current credit value for each queue, wherein the initial credit value indicates available credit per group-specific time interval and the current credit value represents available credit at a particular point within the group-specific time interval.

9. The network processor IC of claim 8 wherein the rates of queues within a queue group are set as a function of the initial counter value of the respective group-specific hardware counter and the initial credit value of each respective queue.

10. The network processor IC of claim 9 wherein the scheduler is further configured to include a queue group in a group-level scheduling arbitration process once the group-specific hardware counter indicates that the group-specific time interval of the respective queue group has expired.

11. The network processor IC of claim 10 wherein:
priorities are associated with the queue groups and wherein the scheduler is further configured to select groups from the multiple queue groups in response to the queue group priorities; and
priorities are associated with the queues within a queue group and wherein the scheduler is further configured to select queues from the queues in a queue group in response to the queue weights.

12. The network processor IC of claim 10 wherein the scheduler is further configured to interleave bandwidth allocations amongst queues in a queue group, wherein interleaving bandwidth allocations amongst queues in a queue group comprises, within one round of queue processing, establishing a limit and scheduling packets up to the limit regardless of whether the corresponding queue has credit available and revisiting queues in a round-robin fashion until the queues are out of credits or have no queued packets.

13. The network processor IC of claim 8 wherein sub-groups of queues are established within a queue group and wherein traffic within the sub-groups is rate shaped and scheduled in response to the corresponding group-specific hardware counter.

14. The network processor IC of claim 13 wherein the number of sub-groups within a queue group is a power of two.

* * * * *